Aug. 7, 1962 W. C. SPRAGUE 3,048,286
TOWING MECHANISM

Filed Dec. 29, 1958 2 Sheets-Sheet 1

INVENTOR.
WESLEY C. SPRAGUE
BY John R. Walker, III
Attorney

Aug. 7, 1962     W. C. SPRAGUE     3,048,286
TOWING MECHANISM
Filed Dec. 29, 1958     2 Sheets-Sheet 2
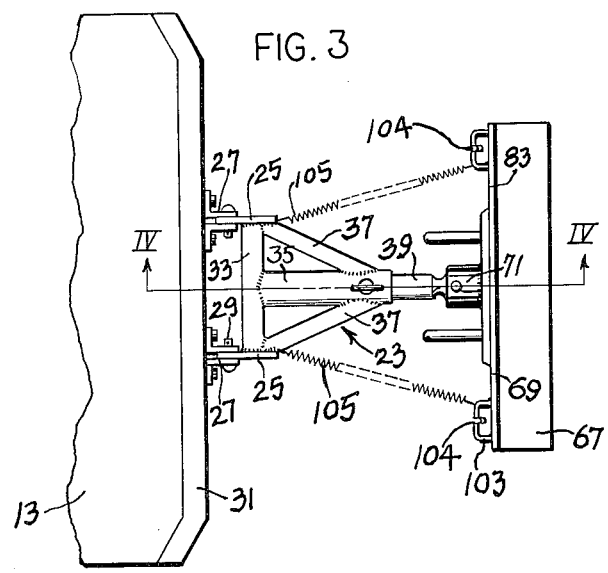
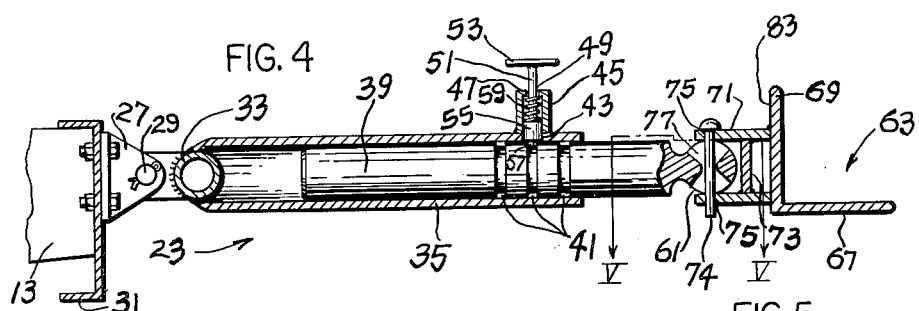
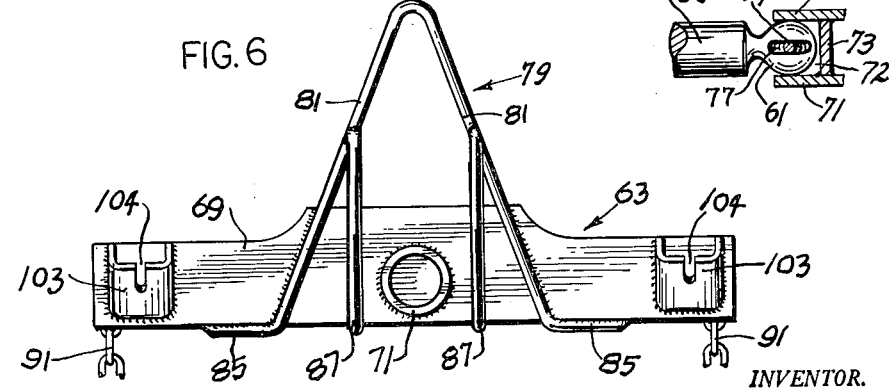
INVENTOR.
WESLEY C. SPRAGUE
BY
John R. Walker, III
Attorney

United States Patent Office 3,048,286
Patented Aug. 7, 1962

3,048,286
TOWING MECHANISM
Wesley C. Sprague, Memphis, Tenn., assignor to Sprague's E-Z-Lift Towbar, Inc., Memphis, Tenn.
Filed Dec. 29, 1958, Ser. No. 783,540
8 Claims. (Cl. 214—86)

This invention relates to a towing mechanism or hitch for a wrecking truck.

There have been a number of disadvantages in heretofore known towing mechanisms employed with wrecking trucks for towing vehicles, among the disadvantages being the following: (1) Difficulty in attaching the towing devices to the towed vehicle. This has been particularly the case when the vehicle to be towed is badly damaged so that the vehicle body is closely adjacent the ground. It will be understood that this difficulty in attaching is caused by the fact that it is practically impossible to get attachment means, such as chains and the like, secured to the under side of the vehicle or around the bumper thereof with the body of the vehicle being closely adjacent the ground. (2) Difficulty in picking up a vehicle to be towed when it is in a crowded or inaccessible place. This same difficulty is experienced when it is desired to deposit the vehicle after towing into a crowded or inaccessible place. (3) The extended length of time required to pick up the vehicle for towing. It will be understood that this is a particular disadvantage in most cases since a vehicle which is damaged is usually in a position that blocks traffic. (4) The lack of complete control by the driver of the wrecker over the towed vehicle.

The present invention is directed towards overcoming the above-mentioned and other disadvantages inherent in previous towing mechanisms.

Thus, one of the objects of the present invention is to provide a towing mechanism which is so constructed that it is adapted to pick up a vehicle without the aid of any attachment means as chains or the like.

A further object is to provide such a towing mechanism which quickly and easily scoops or shovels the vehicle up into a towing position.

A further object is to provide such a towing mechanism which is adapted to pick up a vehicle which is at an angle relative to the wrecker, whereby, when there is insufficient room or it is inconvenient for the wrecker to be in straight end-to-end alignment with the vehicle to be towed, the vehicle nevertheless may be easily and quickly lifted.

A further object is to provide such a towing mechanism in which no chains or the like are tied around the bumper or other parts of the vehicle susceptible to being marred or damaged.

A further object is to provide such a towing mechanism which, regardless of how quickly the wrecker stops, the towed vehicle will not run up on the wrecker and damage the grill of the towed vehicle.

A further object is to provide a towing mechanism wherein there is perfect control in turning corners, backing, etc., so as to make the towing operation a great deal safer than heretofore possible.

A further object is to provide safety means in such a towing mechanism to prevent accidental removal of the vehicle from the towing mechanism.

A further object is to provide such a safety means which attaches to a portion of the under side of the towed vehicle, yet which is adapted to be attached thereto without having to climb under the towed vehicle.

A further object is generally to improve the design and construction of towing mechanisms.

The means by which the foregoing and other objects of the present invention are accomplished and the manner of their accomplishment will be readily understood from the following specification upon reference to the accompanying drawings, in which:

FIG. 3 is a top plan view of the same, but with the towed vehicle removed therefrom and with parts of the towing mechanism and the wrecker removed for purposes of clarity.

FIG. 4 is an enlarged fragmentary sectional view taken as on the line IV—IV of FIG. 3 with parts removed and with the arm shown partly in elevation for purposes of clarity.

FIG. 5 is a fragmentary sectional view taken as on the line V—V of FIG. 4.

FIG. 6 is an elevational view of the tray of the present invention, looking from the forward side thereof rearwardly.

Figure 1:
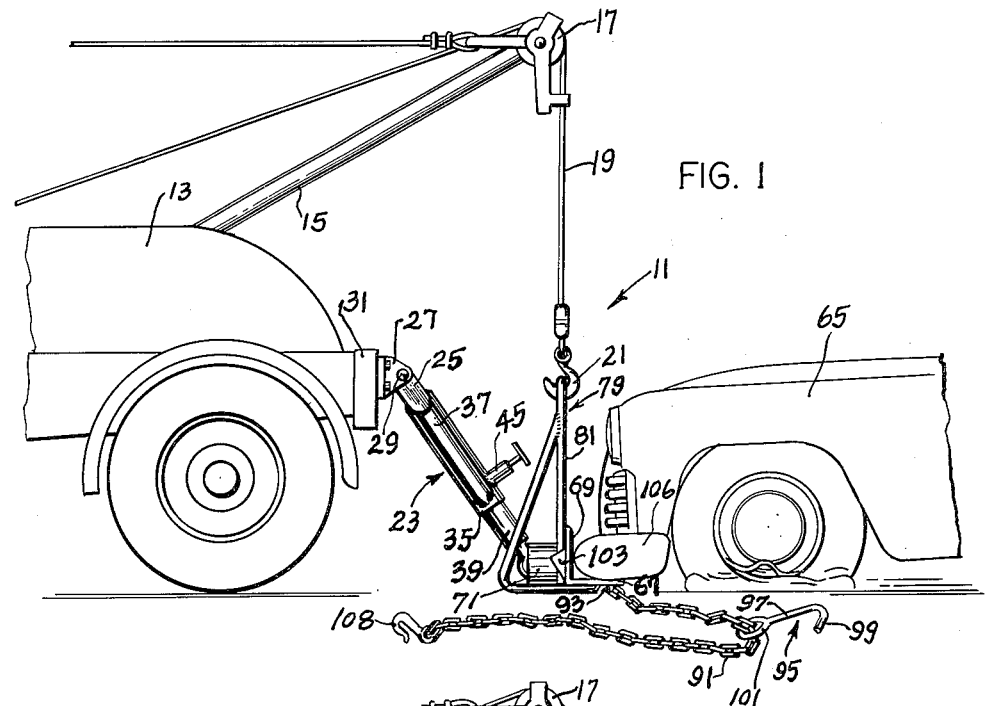
FIG. 1 is a side elevational view of the improved towing mechanism of the present invention, showing the same mounted on the rear of a towing vehicle and in a position ready to lift the towed vehicle, with only fragmentary portions of the towing vehicle and the towed vehicle being shown and with parts removed for purposes of clarity.

Referring now to the drawings in which the various parts are indicated by numerals, the towing mechanism 11 of the present invention is adapted to be employed with a conventional towing vehicle or wrecker 13 having suitable lifting mechanism as a boom 15, pulley 17 rotatably mounted from adjacent the outer end of the boom, and cable 19 reeved through pulley 17, which cable is provided with a hook 21 attached adjacent the outer end thereof and which cable is wound about a reel or the like (not shown) for pulling in and letting out cable 19.

Towing mechanism 11 includes a substantially rigid frame 23 pivotally mounted on wrecker 13 adjacent the rearward end thereof for pivoting or swinging movement about a substantially horizontal axis between lowered and raised positions. The means for pivotally mounting frame 23 is preferably as follows: Spaced side plates 25 of frame 23 are respectively pivotally connected to brackets 27 as by pins 29 or the like respectively extending through aligned apertures in the side plates and brackets, and the brackets 27 are, in turn, respectively fixedly mounted by suitable means from a supporting member of wrecker 13, as bumper 31.

Frame 23 preferably includes a transverse member 33 extending between side plates 25 and fixedly attached thereto as by welding or the like. Additionally, frame 23 includes a pipe 35 attached adjacent one end to transverse member 33 intermediate the ends thereof and rearwardly extends therefrom. Also preferably included in frame 23 are a pair of braces 37 extending from adjacent opposite ends of transverse member 33 in a converging relationship to their respective places of attachment with pipe 35 on opposite sides thereof, as best seen in FIG. 3. The attachment of each of braces 37 with transverse member 33 and pipe 35 as above described is by welding or the like, whereby frame 23 is rigid in construction.

The outer or rearward end of pipe 35 is open and a cylindrical and elongated arm 39 is slidably and rotatably received therein. In other words, arm 39 is adapted to slide forwardly and rearwardly lengthwise in pipe 35 and is adapted to rotate about its longitudinal axis in the pipe. Along the length of arm 39 a plurality of spaced annular grooves 41 are provided.

An aperture 43 is provided in the side of pipe 35 and a hollow cylindrical casing 45 is fixedly mounted from pipe 35 surrounding aperture 43 and outwardly extending from the pipe. An annular shoulder 47 is integrally provided adjacent the outer end of casing 45 and defines a hole 49 centrally thereof, through which hole slidably extends a plunger 51 having a handle 53 adjacent the outer end thereof. In the interior of casing 45 plunger 51 is provided with an enlarged portion 55 spaced from the inner end 57 of the plunger. Resilient means, as a compression spring 59, surrounds a portion of plunger 51 and extends between shoulder 47 and enlarged portion 55 to urge the plunger inwardly into engagement with arm 39 in one of grooves 41 to hold arm 39 against lengthwise movement, yet permits rotation thereof. From the foregoing, it will be understood that the effective length of arm 39, i.e., the distance of the rearward or outer end thereof from wrecker 13, may be changed by pulling out on handle 53 to move the end 57 of plunger 51 to a retracted or outward position in which the end of the plunger is removed from groove 41. Then, arm 39 is positioned lengthwise until one of grooves 41 is opposite plunger 51 to give the desired effective length of arm 39. After arm 39 is positioned at the selected place, the plunger 51 is released to allow the plunger to assume again an extended position in which the end 57 extends into said one of grooves 41, whereby arm 39 is again held against lengthwise movement. Arm 39 additionally includes a ball 51 integrally formed adjacent the rearwardly or outwardly end thereof.

Figure 2:
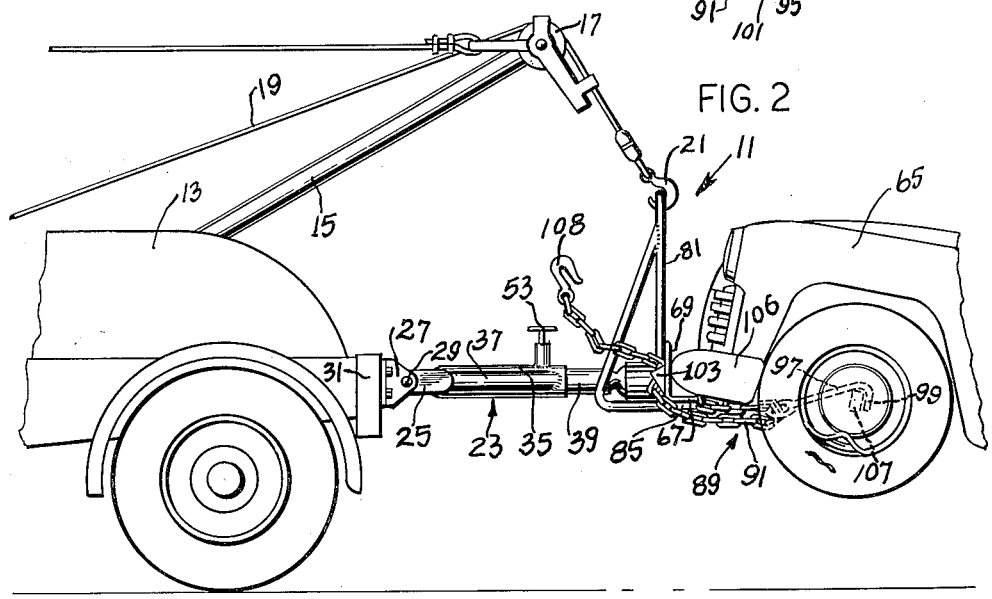
FIG. 2 is a view similar to FIG. 1, but showing the towing mechanism in a raised position lifting the front end of the towed vehicle so that it is in a position to be towed and showing the safety means hooked in position.

A transverse elongated tray 63 is provided for carrying a towed vehicle 65 as best shown in FIG. 2, wherein it will be seen the leading end of the vehicle is raised so that the vehicle may be towed. Tray 63 is preferably right-angular in cross-sectional shape and includes a substantially horizontal flange 67 and a substantially vertical flange 69 integrally formed adjacent its lower edge with horizontal flange 67 adjacent the rearward edge of the horizontal flange so that the vertical flange extends substantially upward from the horizontal flange. A substantially cylindrical hollow projection 71 is fixedly mounted as by welding or the like on vertical flange 69 and forwardly extends therefrom. Projection 71 is open at its forward end to provide a socket 72 which turnably receives ball 61 therein. A disc 73 is fixedly mounted in projection 71, rearwardly of ball 61, and is normally spaced therefrom. When projection 71 moves forward relative to ball 61, as during the towing operation when wrecker 13 is suddenly stopped, disc 72 receives the thrust of ball 61. A pin 74 extends through aligned apertures 75 in opposite sides of projection 71 and through a bore 77 aligned with apertures 75, whereby the pin holds ball 61 in projection 71 against accidental removal thereof. Bore 77 is sufficiently large to permit the slight forward movement of pin 74 required to permit ball 61 to contact disc 72 to receive the thrust, as above described. The transverse width of bore 77 is only slightly greater than the diameter of pin 74, as best seen in FIG. 5, and the bore is flared outwardly from adjacent the center of ball 61 upwardly and from adjacent the center downwardly, as best shown in FIG. 4, so that in cross-section as viewed in this figure the bore is somewhat in the shape of an hour glass. From the foregoing, it will be understood that the shape of bore 77 permits tray 63 to pivot relative to arm 39 about a substantially horizontal axis so that horizontal flange 67 may remain in a substantially horizontal position during raising and lowering of tray 63, as shown in FIGS. 1 and 2. Also, at the same time, the shape of bore 77 prevents rotation of projection 71 and tray 63 relative to arm 39. Thus, any rotation of tray 63 relative to frame 23 can only occur by virtue of arm 39 rotating in pipe 35. A third movement permitted by the particular shape of bore 77 is the pivot of tray 63 relative to arm 39 about a substantially vertical axis. The above-described movements permit the picking up of a vehicle which is at an angle relative to wrecker 13, i.e. not in end-to-end alignment as viewed from above the wrecker and vehicle.

A hanger 79 is rigidly mounted on tray 63 and upwardly extends therefrom with hook 21 hooked thereto to support tray 63 by cable 19 so that the tray may be raised and lowered by the lifting mechanism of wrecker 13. Hanger 79 is preferably constructed in the shape of a bail, including two rods 81 integrally joined adjacent the upper ends thereof and diverging downwardly along the forward face 83 of vertical flange 69 where the rods are respectively joined to the vertical flange as by welding or the like. Thence, rods 81 respectively project rearwardly and outwardly under horizontal flange 67 as at portions 85 where they are respectively fixedly attached thereto as by welding or the like. Additional brace rods 87 are preferably provided between rods 81 and tray 63 and attached thereto as by welding or the like.

Safety means is provided for preventing accidental removal of towed vehicle 65 from tray 63 while the vehicle is being towed. Said safety means comprises a pair of attachment assemblies 89 attached to either side of tray 63, only one of which will be described since they are of substantially identical construction. Each attachment assembly 89 includes a chain 91 fixedly attached adjacent one end thereof to tray 63 as at 93. Additionally, attachment assembly 89 includes a hook 95 which comprises an elongated shank 97, a depending portion 99 integrally formed adjacent one end of the shank, and an eyelet 101 integrally formed adjacent the other end of the shank, through which eyelet slidably extends chain 91. For each of attachment assemblies 89 is provided a lip 103 respectively fixedly mounted from vertical flange 69 on the face 83 thereof and diverges outwardly therefrom. Each of lips 103 is provided with an upwardly opening slot 104, which slot is slightly greater in width than the width of a link of chain 91, whereby the slot is adapted to receive one of the links for the securing of the chain thereto.

A pair of tension springs 105 are disposed on opposite sides of towing mechanism 11 and extend between frame 23 and tray 63 for centering the tray in the position shown in FIG. 3 when there is no load thereon. It will be understood that each of the springs 105 exerts substantially the same force on tray 63 to balance one another and cause the tray to assume a centered position when the tray is unrestrained.

In the operation of the towing mechanism 11 of the present invention, wrecker 13 is backed up to the vehicle 65 to be towed. If the vehicle is one which is so damaged that the body thereof is adjacent the ground (as, for example, like the one shown in FIG. 1), it will be understood that with tray 63 lowered to the ground as shown in this figure and, with the brake set on vehicle 65, wrecker 13 is backed until horizontal flange 67 is under the bumper 106 of vehicle 65 as shown in FIG. 1. Then tray 63 is raised by cable 19 so that the tray simply "scoops" or "shovels" the front end of the vehicle 65 upwardly until in a towing position as shown in FIG. 2. During this hoisting, tray 63 remains substantially level, i.e., horizontal flange 67 remains substantially horizontal. In the example shown in FIG. 1, the bumper 106 is slightly spaced from the ground, but it will be apparent that if vehicle 65 were even closer to the ground so that bumper 106 were contacting the ground the front end of the vehicle 65 could just as easily be raised by tray 63. In this case, wherein the bumper 106 is contacting the ground, the lifting operation is as follows: With tray 63 lowered to the ground and with the brake set on vehicle 65, wrecker 13 is backed until the rearward edge of horizontal flange 67 is contacting the lower edge of bumper 106. Then tray 63 is raised, as heretofore described, so that the tray "scoops" or "shovels" the front end of vehicle 65 upwardly to a towing position. Thus, horizontal flange 67 is pushed under bumper 106 as it is raised, and it is not necessary to wedge the horizontal flange beneath the bumper before the raising operation is begun. This "scooping" or "shoveling" action of the towing mechanism 11 is an important part of the present invention and is caused by the fact that tray 63 moves in an arc rearwardly relative to wrecker 13 as well as upwardly during the lifting operation, which rearward movement may be observed by comparing the positions of the tray in FIGS. 1 and 2. It will be understood that the above-described hoisting operation is accomplished without the aid of any chains or the like. Thus, the advantages of the present invention over previous towing devices is easily appreciated since, with the vehicle in the position shown in FIG. 1 or in a lowered position with bumper 106 on the ground, it would be very difficult with other types of towing devices to wrap a chain around the bumper or otherwise attach a towing device to the towed vehicle.

After vehicle 65 is raised to the position shown in FIG. 2, as previously described, each of attachment assemblies 89 is secured in place as follows: Hook 95 is engaged over a suitable portion underneath vehicle 65 (as, for example, hooked over the axle 107, as shown in FIG. 2). Next, chain 91 is drawn tight by pulling on the free end thereof and then the chain is snugly attached to tray 63 as by engaging a link thereof in slot 104. The loose end of chain 91 is preferably provided with a hook 108 attached thereto so that the hook may be engaged on lip 103 to prevent the end of the chain from dragging the ground. For purposes of clarity, hook 108 is not shown attached to lip 103 in FIG. 2, but in this figure chain 91 is shown engaged in slot 104 and hook 108 is ready to be engaged on lip 103. The above-described procedure is accomplished for both of attachment assemblies 89 and the vehicle 65 is ready for towing.

From the foregoing description, it is apparent that a towing mechanism is provided which is highly efficient in towing and in picking up and depositing a vehicle. Additionally, it is apparent that no chains or the like are needed to pick up the towed vehicle, but that the towing mechanism is adapted to easily and quickly pick up the vehicle, regardless of the damage done thereto.

Although the invention has been described and illustrated with respect to a preferred embodiment thereof, it is to be understood that it is not to be so limited since changes and modifications may be made therein which are within the full intended scope of this invention as hereinafter claimed.

I claim:
1. In a towing wrecker having a supporting member adjacent the rearward end thereof and a lifting mechanism including a lifting cable, a towing mechanism comprising a rigid frame pivotally mounted on said supporting member for pivot between raised and lowered positions about a substantially horizontal axis, said frame including a rearwardly opening pipe, an arm telescopically and rotatably mounted in said pipe for movement between rearwardly extended and forwardly retracted positions relative to said frame, said arm being provided with a plurality of annular grooves spaced along the length thereof, a plunger movably mounted on said pipe for movement between a retracted position in which the plunger is out of said grooves and an extended position in which the plunger extends into one of the grooves and holds the arm against lengthwise movement relative to said pipe, resilient means urging said plunger into said extended position for retraction by hand so that the distance of said arm from said supporting means may be varied, said arm including a ball adjacent the rearward end thereof, said ball being provided with a bore extending therethrough, a tray including a substantially vertical flange and a substantially horizontal flange integrally formed with the lower edge of said vertical flange and extending rearwardly therefrom whereby the tray is adapted to carry a towed vehicle with the bumper of said towed vehicle resting on said horizontal flange, a hanger rigidly mounted on said tray and upwardly extending therefrom, means for coupling said lifting cable and said hanger together so that said tray may be raised and lowered by said lifting mechanism, a projection rigidly mounted on said tray and forwardly extending therefrom, said projection being provided with a forwardly opening socket, said ball being rotatably received in said socket and supported by said projection, a vertical pin carried by said projection and extending through said bore whereby said tray is coupled to said arm and movable from side to side about a substantially vertical axis, said bore being provided with flared portions respectively adjacent the upper and lower ends thereof so that said arm is adapted to pivot relative to said tray to permit the horizontal flange of said tray to remain substantially horizontal when the tray is being raised and lowered, said tray being movable in an arcuate path of movement from a position adjacent the ground surface upwardly and at the same time rearwardly relative to said wrecker, whereby said tray is adapted to scoop up a vehicle to be towed with said wrecker remaining stationary.

2. The structure according to claim 1 in which safety means is provided for preventing accidental removal of said towed vehicle from said tray, said safety means comprising at least one chain attached adjacent one end to said tray; a hook including an elongated shank, a depending portion integrally formed adjacent one end of said shank and an eyelet integrally formed adjacent the other end of said shank; said chain slidably extending through said eyelet, an upwardly extending lip fixedly attached to said tray, said lip being provided with an upwardly opening slot adapted to receive a portion of said chain for the securing thereof, said hook being adapted to be removably hooked over a portion of said towed vehicle on the under side thereof, and said chain being secured in said slot to establish a loop of said chain linked through said eyelet whereby being adapted to prevent accidental removal of said towed vehicle from said tray.

3. In a towing wrecker having a supporting member adjacent the rearward end thereof and a lifting mechanism including a lifting cable, a towing mechanism comprising a rigid frame pivotally mounted on said supporting member for pivot between raised and lowered positions about a substantially horizontal axis, said frame including a rearwardly opening pipe, an arm telescopically and rotatably mounted in said pipe for movement between rearwardly extended and forwardly retracted positions relative to said frame, means mounted on said pipe and cooperating with said arm for limting forward and rearward movement of said arm from selected positions in said pipe so that the distance of said arm from said supporting means may be varied, said arm including a ball adjacent the rearward end thereof, said ball being provided with a bore extending therethrough, a tray including a substantially vertical flange and a substantially horizontal flange integrally formed with the lower edge of said vertical flange and extending rearwardly therefrom whereby the tray is adapted to carry a towed vehicle with the bumper of said towed vehicle resting on said horizontal flange, a hanger rigidly mounted on said tray and upwardly extending therefrom, means for coupling said lifting cable and said hanger together so that said tray may be raised and lowered by said lifting mechanism, a projection rigidly mounted on said tray and forwardly extending therefrom, said projection being provided with a forwardly opening socket, said ball being rotatably received in said socket, a pin carried by said projection and extending through said bore whereby said tray is coupled to said arm and movable from side to side about a substantially vertical axis, said bore being provided with flared portions respectively adjacent the upper and lower ends thereof so that said arm is adapted to pivot relative to said tray to permit the horizontal flange of said tray to remain substantially horizontal when the tray is being raised and lowered, said tray being movable in an arcuate path of movement from a position adjacent the ground surface upwardly and at the same time rearwardly relative to said wrecker, whereby said tray is adapted to scoop up a vehicle to be towed with said wrecker remaining stationary.

4. In a towing wrecker having a supporting member adjacent the rearward end thereof and a lifting mechanism including a lifting cable, a towing mechanism comprising a rigid frame pivotally mounted on said supporting member for pivot between raised and lowered positions about a substantially horizontal axis, said frame including a rearwardly opening pipe, an arm telescopically and rotatably mounted in said pipe for movement between rearwardly extended and forwardly retracted positions relative to said frame, means mounted on said pipe and cooperating with said arm for limiting forward and rearward movement of said arm from selected positions in said pipe so that the distance of said arm from said supporting means may be varied, a tray including a substantially vertical flange and a substantially horizontal flange integrally formed with the lower edge of said vertical flange and extending rearwardly therefrom whereby the tray is adapted to carry a towed vehicle with the bumper of said towed vehicle resting on said horizontal flange, a hanger rigidly mounted on said tray and upwardly extending therefrom, means for coupling said lifting cable and said hanger together so that said tray may be raised and lowered by said lifting mechanism, and means pivotally joining said tray with said arm adjacent the rearward end of the arm and being arranged so that the horizontal flange of said tray is permitted to remain substantially horizontal when the tray is being raised and lowered, said tray being movable in an arcuate path of movement from a position adjacent the ground surface upwardly and at the same time rearwardly relative to said wrecker, whereby said tray is adapted to scoop up a vehicle to be towed with said wrecker remaining stationary.

5. The structure according to claim 4 in which safety means is provided for preventing accidental removal of said towed vehicle from said tray, said safety means comprising at least one chain attached adjacent one end to said tray; a hook including an elongated shank, a depending portion integrally formed adjacent one end of said shank and an eyelet integrally formed adjacent the other end of said shank; said chain slidably extending through said eyelet, an upwardly extending lip fixedly attached to said tray, said lip being provided with an upwardly opening slot adapted to receive a portion of said chain for the securing thereof, said hook being adapted to be removably hooked over a portion of said towed vehicle on the under side thereof in a nonsupporting disposition relative to the towed vehicle, and said chain being secured in said slot to establish a loop of said chain linked through said eyelet whereby being adapted to prevent accidental removal of said towed vehicle from said tray.

6. In a towing wrecker having a supporting member adjacent the rearward end thereof and a lifting mechanism including a lifting cable, a towing mechanism comprising a rigid frame pivotally mounted on said supporting member for pivot between raised and lowered positions about a substantially horizontal axis, an arm carried by said frame and extending rearwardly therefrom, a tray including a substantially vertical flange and a substantially horizontal flange integrally formed with the lower edge of said vertical flange and extending rearwardly therefrom whereby the tray is adapted to carry a towed vehicle with the bumper of said towed vehicle resting on said horizontal flange, a hanger rigidly mounted on said tray and upwardly extending therefrom, means for coupling said lifting cable and said hanger together so that said tray may be raised and lowered by said lifting mechanism, and means pivotally joining said tray with said arm adjacent the rearward end of the arm and being arranged so that the horizontal flange of said tray is permitted to remain substantially horizontal when the tray is being raised and lowered, said tray being movable in an arcuate path of movement from a position adjacent the ground surface upwardly and at the same time rearwardly relative to said wrecker, whereby said tray is adapted to scoop up a vehicle to be towed with said wrecker remaining stationary.

7. In a towing wrecker having a supporting member adjacent the rearward end thereof and a lifting mechanism including a lifting cable, a towing mechanism comprising a tray disposed rearwardly of said wrecker, said tray including a transversely elongated and substantially horizontal flange adapted to carry a towed vehicle with the bumper of said towed vehicle resting on said horizontal flange, means coupling said lifting cable and said tray so that said tray is supported by said lifting mechanism for the raising and lowering thereof, spacing means connected adjacent one end to said supporting member and connected adjacent the other end to said tray for causing said tray to swing in a path rearwardly and at the same time upwardly relative to said wrecker from adjacent the ground surface when an upward force is exerted by said lifting cable on said tray whereby with said wrecker remaining stationary said tray is adapted to scoop up said bumper of said towed vehicle to place said towed vehicle in a towing position.

8. The structure according to claim 7 in which safety means is provided for preventing accidental removal of said towed vehicle from said tray, said safety means comprising at least one chain attached adjacent one end to said tray; a hook including an elongated shank, a depending portion integrally formed adjacent one end of said shank and an eyelet integrally formed adjacent the other end of said shank; said chain slidably extending through said eyelet, an upwardly extending lip fixedly attached to said tray, said lip being provided with an upwardly opening slot adapted to receive a portion of said chain for the securing thereof, said hook being adapted to be removably hooked over a portion of said towed vehicle on the under side thereof in a nonsupporting disposition relative to the towed vehicle, and said chain being secured in said slot to establish a loop of said chain linked through said eyelet whereby being adapted to prevent accidental removal of said towed vehicle from said tray.

References Cited in the file of this patent

UNITED STATES PATENTS

| | | |
|---|---|---|
| 2,113,879 | Delalandre | Apr. 12, 1938 |
| 2,125,479 | Zagelmeyer | Aug. 2, 1938 |
| 2,471,636 | Martin | May 31, 1949 |
| 2,497,379 | Vandergrift et al. | Feb. 14, 1950 |
| 2,555,663 | Schoube | June 5, 1951 |
| 2,661,106 | Morgan | Dec. 1, 1953 |
| 2,701,069 | Hawkins | Feb. 1, 1955 |
| 2,726,097 | Darrough | Dec. 6, 1955 |
| 2,795,435 | Oritz et al. | June 11, 1957 |
| 2,830,827 | Albrecht | Apr. 15, 1958 |
| 2,913,131 | Holmes | Nov. 17, 1959 |